US009779151B2

(12) United States Patent
Lu et al.

(10) Patent No.: US 9,779,151 B2
(45) Date of Patent: Oct. 3, 2017

(54) VISUALIZING RELATIONSHIPS IN DATA SETS

(71) Applicants: Minghao Lu, Shanghai (CN); Muthuraj Thangavel, Madurai/Tamilnadu (IN); Jianhua Wen, Shanghai (CN)

(72) Inventors: Minghao Lu, Shanghai (CN); Muthuraj Thangavel, Madurai/Tamilnadu (IN); Jianhua Wen, Shanghai (CN)

(73) Assignee: Business Objects Software Ltd., Dublin (IE)

( * ) Notice: Subject to any disclaimer, the term of this patent is extended or adjusted under 35 U.S.C. 154(b) by 367 days.

(21) Appl. No.: 14/496,702

(22) Filed: Sep. 25, 2014

(65) Prior Publication Data

US 2016/0092529 A1   Mar. 31, 2016

(51) Int. Cl.
*G06F 3/048* (2013.01)
*G06F 17/30* (2006.01)
*G06F 3/0484* (2013.01)
*G06F 3/0486* (2013.01)
*G06F 3/0488* (2013.01)
*G06F 3/0482* (2013.01)

(52) U.S. Cl.
CPC ...... *G06F 17/30572* (2013.01); *G06F 3/0486* (2013.01); *G06F 3/04842* (2013.01); *G06F 3/0482* (2013.01); *G06F 3/0488* (2013.01); *G06F 17/30867* (2013.01)

(58) Field of Classification Search
None
See application file for complete search history.

(56) References Cited

U.S. PATENT DOCUMENTS

| 2011/0302110 A1* | 12/2011 | Beers | G06F 17/30554 706/11 |
| 2015/0134694 A1* | 5/2015 | Burke | G06F 17/30424 707/769 |
| 2015/0254369 A1* | 9/2015 | Hou | G06F 3/0486 707/798 |

OTHER PUBLICATIONS

Cristina Gena, Methods and techniques for the evaluation of user-adaptive systems, 2005, The Knowledge Enginerring Review, vol. 20:1, pp. 1-37.*

(Continued)

*Primary Examiner* — Doon Chow
*Assistant Examiner* — Tam Tran
(74) *Attorney, Agent, or Firm* — Fish & Richardson P.C.

(57) ABSTRACT

Some examples of visualizing relationships in data sets can be implemented as a method by one or more computer systems. Dimension objects and multiple measure objects are displayed adjacent to a cause region and an effect region in a user interface. Each dimension object represents an input category associated with an input quantity that contributes to a total quantity in a data set. Each measure object represents an output category associated with an output quantity based on an input category. A dimension object and a measure object can be moved into the cause region and the effect region, respectively, in response to input. From the data set, an output quantity associated with the measure object is determined based on an input quantity associated with the dimension object from the total quantity in the data set. A result representing the output quantity is displayed in the measure object.

18 Claims, 14 Drawing Sheets

(56) References Cited

OTHER PUBLICATIONS

Rajan Chandras, A New Generation of Business Intelligence, Jul. 2005, Intelligent Enterprise, p. 18.*

Introducing Tableau 8.2; Tableau Software; Business Intelligence and Analytics; 2 pages; <<http://www.tableausoftware.com/>> [Aug. 4, 2014].

SurveyMonkey: Free online survey software & questionnaire tool; 2 pages; <<http://www.surveymonkey.com/>> [Aug. 4, 2014].

* cited by examiner

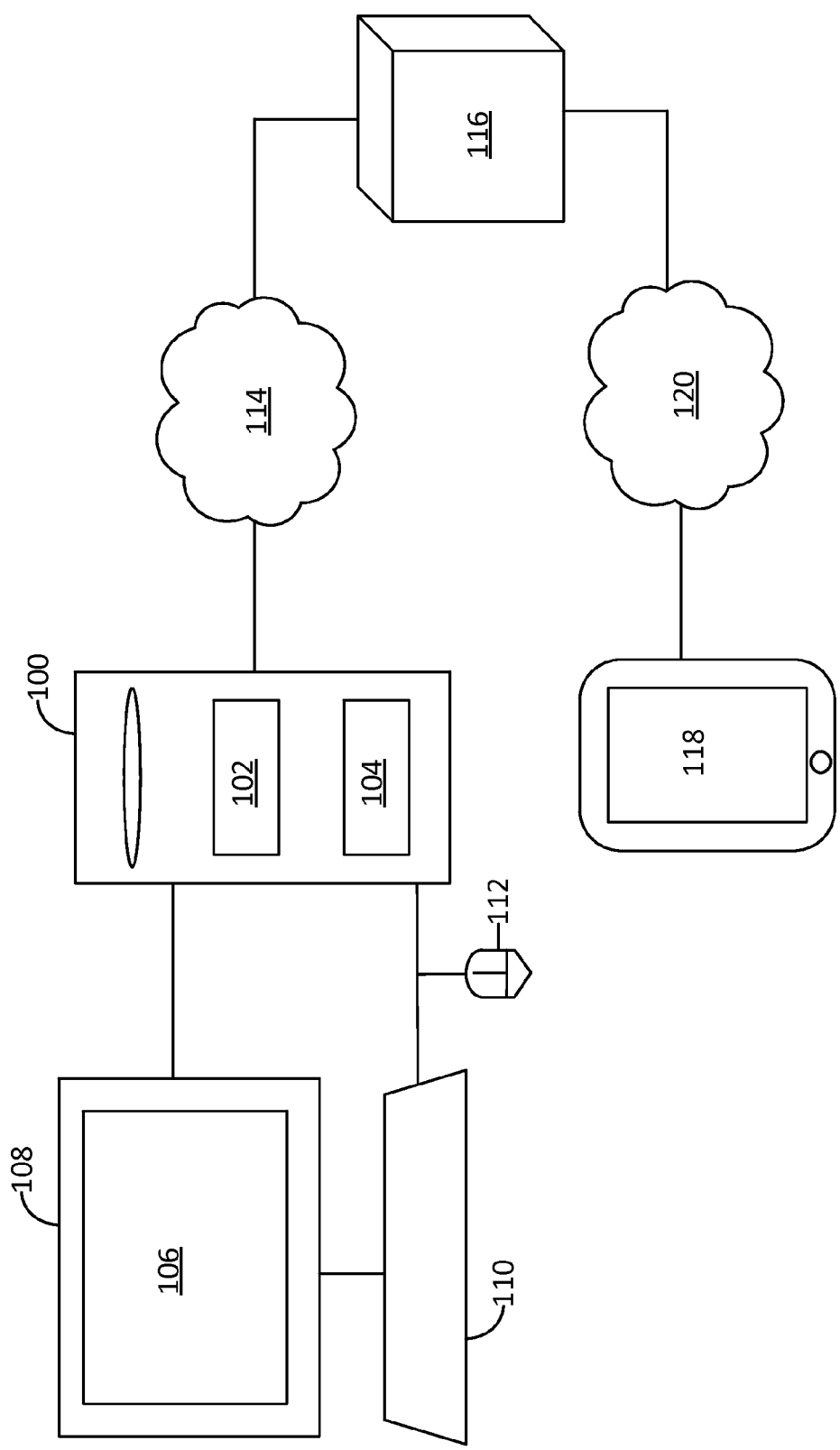

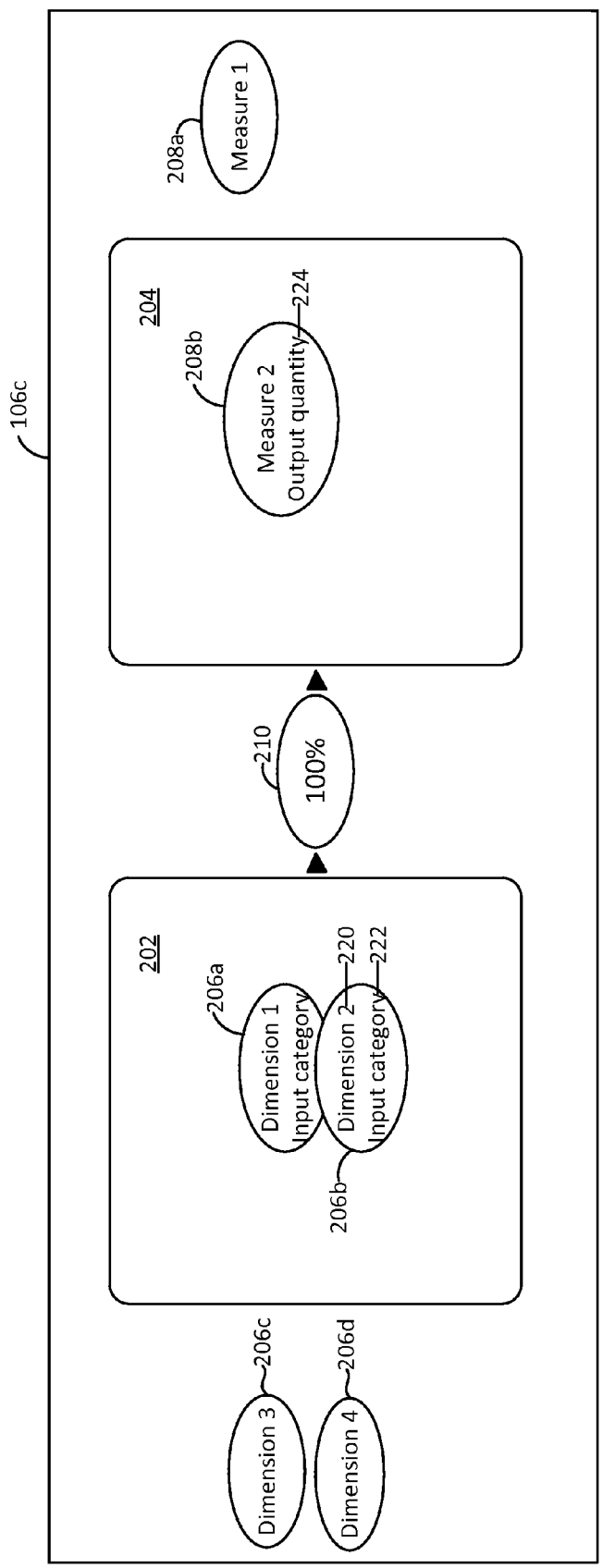

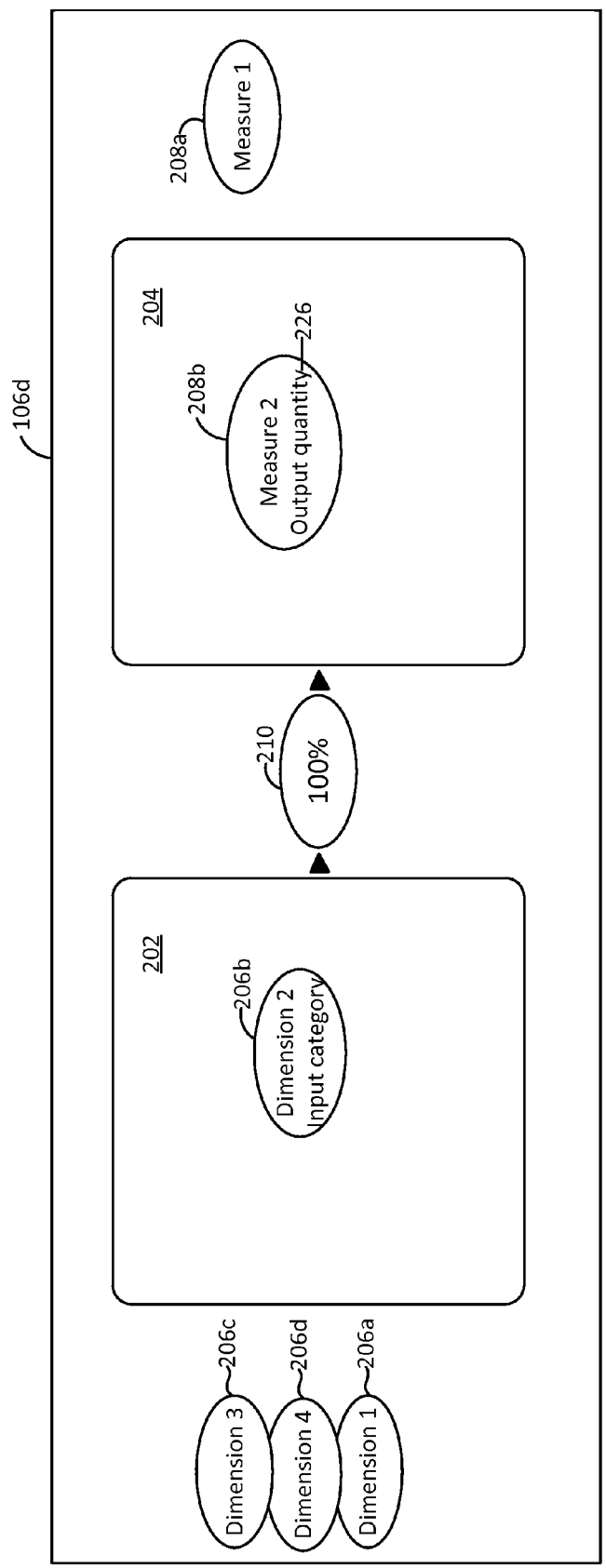

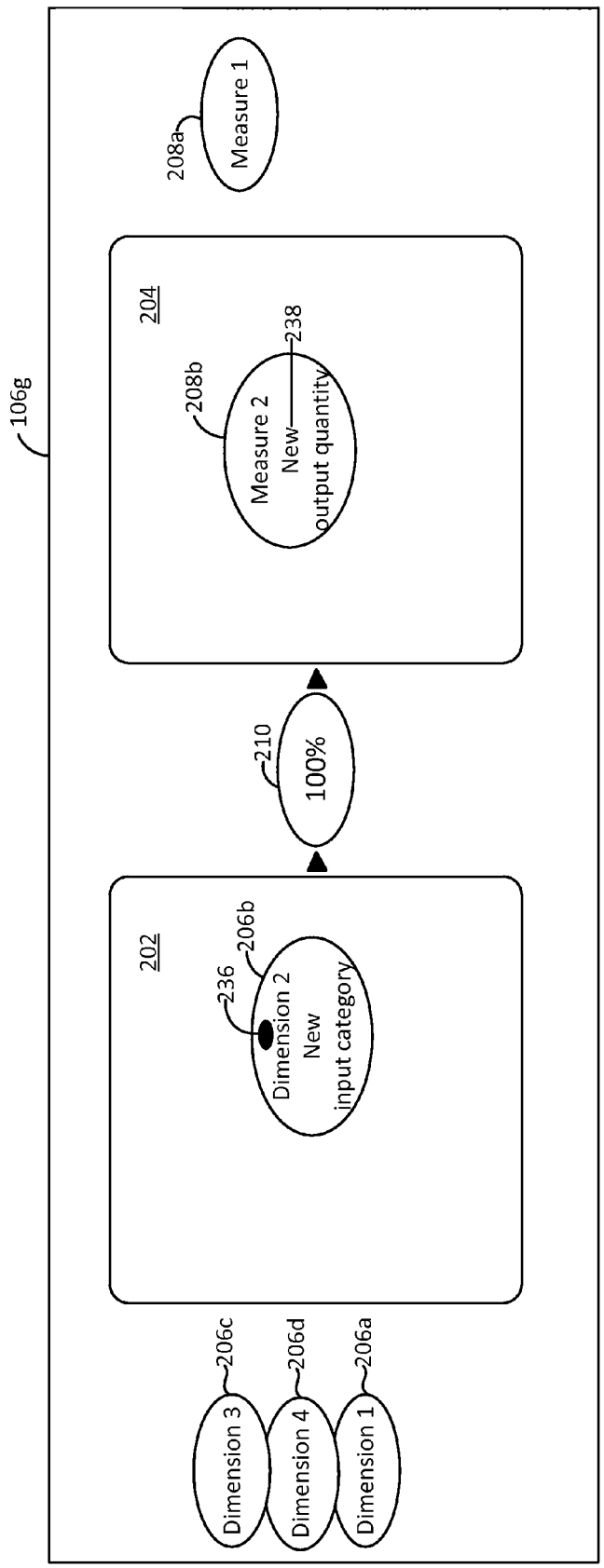

VISUALIZING RELATIONSHIPS IN DATA SETS

TECHNICAL FIELD

This disclosure relates to computer-implemented methods, computer-readable media, and computer systems for presenting user interfaces to visualize data in data sets.

BACKGROUND

Data analysis is a process of inspecting, cleaning, transforming, and modeling data to discover useful information and identify patterns in the data to suggest conclusions and support decision-making. One aspect of data analysis can include visualizing the data in the data sets in a manner that communicates the interrelationship in the data. Computer systems can implement visualization models to present such interrelationships in one or more charts, e.g., graphs, bar charts, pie charts, and other charts. However, the usefulness of the data in the data sets cannot be properly leveraged if the visualization models are time-consuming, hard to understand, limited in interaction, and unable to explore interrelationship between data in the data sets.

SUMMARY

This disclosure describes computer-implemented methods, computer-readable media, and computer systems for presenting user interfaces to visualize part-to-whole relationships in data sets.

Certain aspects of the subject matter described here can be implemented as a method by one or more computer systems. A user interface including a cause region and an effect region is displayed. Multiple dimension objects and multiple measure objects are displayed adjacent to the cause region and the effect region, respectively. Each dimension object represents an input category associated with an input quantity that contributes to a total quantity in a data set. Each measure object represents an output category associated with an output quantity based on at least one quantity of at least one input category represented by at least one dimension object. A first input to move a first dimension object into the cause region is detected. The first dimension object represents a first input category associated with a first input quantity. A second input to move a first measure object into the measure region is detected. The first measure object represents a first output category associated with a first output quantity. In response to detecting the first input and the second input, the first dimension object is displayed in the cause region. The first measure object is displayed in the effect region. From the data set, the first output quantity is determined based on the first input quantity from the total quantity in the data set. A result representing the first output quantity is displayed in the first measure object.

This, and other aspects, can include one or more of the following features. The first output quantity can be a percentage of the first input quantity to the total quantity in the data set. Displaying the result representing the first output quantity can include displaying the percentage in the first measure object. A third input to move a second dimension object into the cause region can be detected. In response to detecting the third input, the third dimension object can be displayed in the cause region. From the data set, a second output quantity can be determined based on the first input quantity and a second input quantity represented by the third dimension object. The result displayed in the first measure object can be replaced with a new result representing the second output quantity. The second output quantity can be a percentage of the first input quantity and the second input quantity to the total quantity in the data set. Input to remove the first dimension object from the cause region can be detected. In response, the first dimension object can be removed from the cause region. From the data set, a third output quantity can be determined based on the second input quantity from the total quantity in the data set. The result displayed in the first measure object can be replaced with a new result representing the third output quantity. The first dimension object can represent multiple input categories including a third input category associated with a third input quantity. A selection of the first dimension object displayed in the cause region can be detected. In response, multiple input category objects representing the multiple input categories can be displayed on a boundary of the first dimension object. A selection of the second input category object can be detected. In response, from the data set, a fourth output quantity can be determined based on the third input quantity from the total quantity in the data set. The result displayed in the first measure object can be replaced with a new result representing the fourth output quantity. The selection of the first dimension object displayed in the cause region can be a first selection. A second selection of the first dimension object displayed in the cause region can be detected. In response, a marker object can be displayed in the first dimension object. The marker object can indicate a selection of the multiple input categories represented by the first dimension object. From the data set, a fifth output quantity can be detected based on multiple input quantities associated with the multiple input categories from the total quantity in the data set. The result displayed in the first measure object can be displayed with a new result representing the fifth output quantity. A fourth input to move a second measure object into the effect region can be detected. The second measure object can represent a second output category associated with a sixth output quantity. In response, the second measure object can be displayed in the effect region. From the data set, the sixth output quantity can be determined based on the first input quantity from the total quantity in the data set. A result representing the sixth output quantity can be displayed in the second measure object.

Certain implementations of the subject matter described here can be implemented as a computer-readable medium storing instructions executable by one or more computer systems to perform operations described here. Certain implementations of the subject matter described here can be implemented as a system including one or more computer systems and a computer-readable medium storing instructions executable by the one or more computer systems to perform operations described here.

While generally described as computer-implemented software embodied on tangible media that processes and transforms the respective data, some or all of the aspects may be computer-implemented methods or further included in respective systems or other devices for performing this described functionality. The details of these and other aspects and implementations of the present disclosure are set forth in the accompanying drawings and the description below. Other features and advantages of the disclosure will be apparent from the description and drawings, and from the claims.

BRIEF DESCRIPTION OF THE DRAWINGS

FIG. 1 is a schematic diagram showing computer systems that can present visualizations of data in data sets.

FIGS. 2A-2J are schematic diagrams showing user interfaces to present visualizations of data in data sets.

Like reference numbers and designations in the various drawings indicate like elements.

DETAILED DESCRIPTION

Figure 2A:
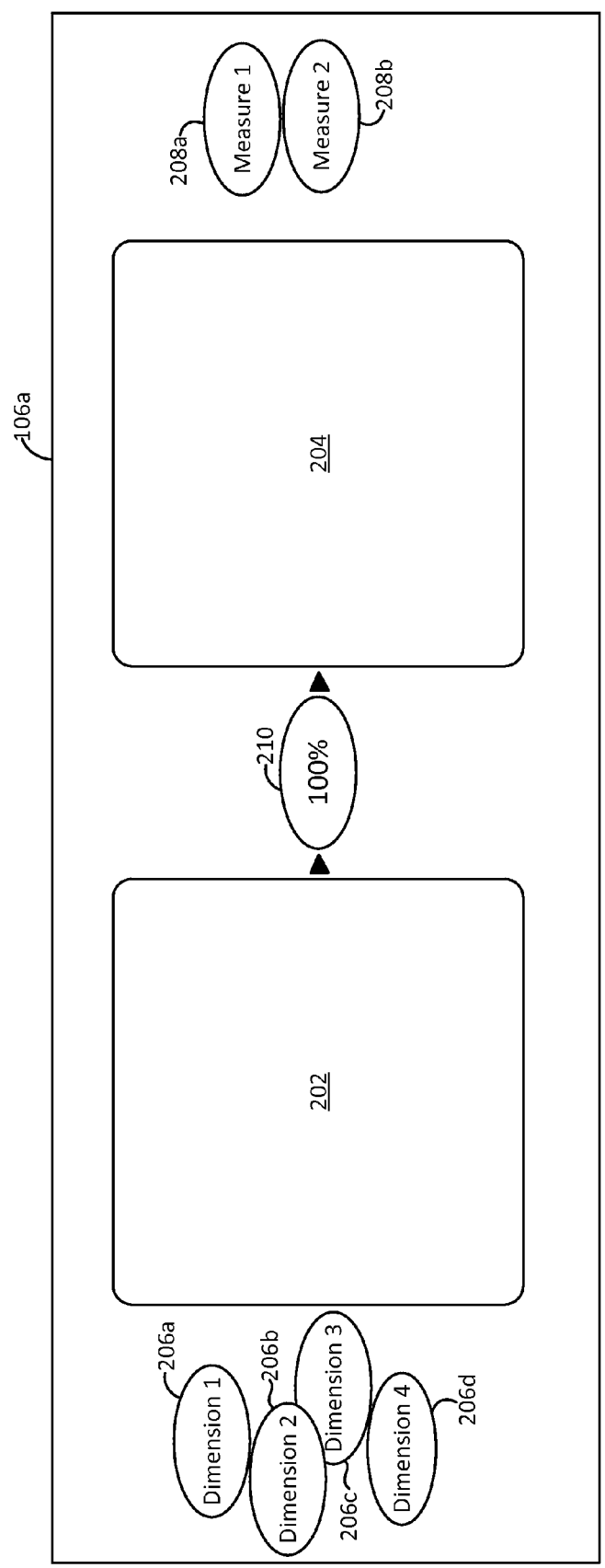

This disclosure describes computer-implemented methods, computer-readable media, and computer systems for presenting user interfaces to visualize part-to-whole relationships in data sets. Data in data sets can be analyzed in several different ways to gain insight into patterns in the data sets. Because the data can be analyzed in several different ways, visualizing the data in each of those ways can enable discovering meaningful patterns in the data. Computer systems can implement computer software applications, e.g., HTML5-based common visualization libraries to visualize the data in the data sets used in data analytics by generating different chart types.

This disclosure describes a new way to analyze data to find percentage contribution and relationships between the data using bubble chart visualization with animation. The data visualization described here can enable users to visualize the percentage contribution and relationship between data in ways that are easier than other data visualizations. Multiple dimensions and multiple measures (described below) can be visualized either individually or simultaneously. For a set of selected dimensions, users can easily see the percentage contribution of selected measures. The percentage contribution can be exported as a snapshot image or as a report (or both) for further actions from the visualized insights. The bubble chart visualization described here can be used for any kind of analytical data which is dimension- and measure-based. Users can easily switch data sources and dynamically explore data to build new scenarios for analyses by adding/removing measure and dimension objects (described below). The data visualization techniques described here can be implemented as extensions to other data analytics and visualization software applications that provide charts such as bubble charts.

FIG. 1 is a schematic diagram showing computer systems that can present visualizations of data in data sets. In some implementations, a computer system 100 can include data processing apparatus 102 (e.g., one or more processors) that can execute computer-readable instructions stored on a computer-readable medium 104 to present visualizations of data in data sets in user interfaces described below. Data sets that include the data can be stored locally on the computer system 100 (e.g., on the computer-readable medium 104) or remotely on one or more computer-readable media 116. The computer system 100 can be connected to the one or more computer-readable media 116 through one or more wired or wireless networks 114 (e.g., the Internet). The computer system 100 can execute the computer-readable instructions to display one or more user interfaces 106 in a display device 108 connected to the computer system 100. The computer system 100 can also be connected to input devices (e.g., a keyboard 110, a mouse 112, or other input devices) using which a user can interact with the user interfaces 106 as described below. In some implementations, the computer system 100 can be a desktop computer, a laptop computer, a client computer device connected to a server computer system, or other computer system. In some implementations, a mobile computer system 118 (e.g., a smart phone, a tablet computer, a personal digital assistant, or other mobile computer system) can implement the computer-implemented methods to present visualizations of survey data. In such implementations, the mobile computer system 118 can be connected to the one or more computer-readable media 116 through one or more wired or wireless networks 120 (e.g., the Internet). The user can interact with the mobile computer system 118 using touch inputs, stylus inputs, trackball inputs, audio inputs, or other types of inputs with or without a keyboard or a mouse.

Example implementations of data visualization are described here with reference to data sets that enable percentage visualization use cases. Such data sets include multiple dimensions and multiple measures. A dimension can represent a cause, and the measure can represent an effect of a dimension. In other words, a dimension can represent an input category associated with an input quantity that contributes to a total quantity in a data set. A measure can represent an output category associated with an output quantity based on at least one quantity of at least one input category represented by a dimension. For example, a data set can include data describing automobiles sold and the revenue generated from the automobile sales. In such a data set, each parameter associated with an automobile can be a dimension. For example, the dimensions in the data set can include a make of the automobile, a model of the automobile, a year of the automobile, a color of the automobile, a country in which the automobile was sold, a duration (e.g., a number of years) for which the automobile was sold, or other parameters associated with the automobile. The measure in the data set can include revenues associated with the dimensions. For example, a first measure can be revenue generated from the sales of automobiles of a particular make. A second measure can be revenue generated from the sales of automobiles of a particular model. A third measure can be revenue generated from the sales of automobiles in a particular country. Another measure can include a number of automobiles for each dimension.

The data set can be stored in a table that includes multiple rows and columns, e.g., as an XLS file, a CSV file, or in another file format. Each column can be described as dimensions and measures. Each row can represent a measure value under the conditions of dimension values in that row. The data visualization techniques described here can be implemented for any type of data set in which the data is structured similarly to data sets associated with dimensions and measures.

FIGS. 2A-2J are schematic diagrams showing user interfaces to present visualizations of data in data sets. FIG. 2A shows an example user interface 106a that the computer system 100 displays in the display device 108 in response to a user selecting a data set for visualization. In the user interface 106a, the computer system 100 displays a cause region 202 and an effect region 204. In some implementations, the computer system 100 can display the cause region 202 and the effect region 204 as the rectangles or as other geometric or non-geometric shapes. The computer system 100 can display the cause region 202 and the effect region 204 adjacent to each other, e.g., horizontally or vertically or at an angle.

In some implementations, the computer system 100 can display a data set object (not shown) in the user interface 106a. In response to the selection of the data set object, the computer system 100 can display a drop-down down list of names of data sets that can be visualized. Using the input device (e.g., the mouse 112 or the keyboard 110 or another input device), the user can select one of the names displayed in the drop-down list. Alternatively, the user can select an option to select a data set that is not included in the drop-down list. In response to the selection of a data set, the computer system 100 can access a computer-readable medium (e.g., the local computer-readable medium 104 or the remote computer-readable media 116 or other computer-readable medium) on which the selected data set is stored. The data set can include multiple rows, each representing an item, and multiple columns, each representing dimensions and measures associated with the item. The computer system 100 can generate multiple dimension objects, each representing a dimension. To each dimension object, the computer system 100 can associate a default dimension (e.g., the first dimension or the dimension with the highest measure). As described below, the user can provide input to change the default dimension to a different dimension.

In the user interface 106a, the computer system 100 can display multiple dimension objects (e.g., dimension object 206a, dimension object 206b, dimension object 206c, dimension object 206d, or fewer or more dimension objects) and multiple measure objects (e.g., measure object 208a, measure object 208b, or fewer or more measure objects). Each dimension object represents an input category associated with an input quantity that contributes to a total quantity in a data set. Each measure object can represent an output category associated with an output quantity based on at least one quantity of at least one input category represented by at least one dimension object. The computer system 100 can display each dimension object and each measure object as an ellipse or as a different geometric or non-geometric shape. The computer system 100 can display the dimension objects and the measure objects anywhere near the vicinities of the cause region 202 and the effect region 204, respectively.

In some implementations, the computer system 100 can display an indicator object 210 between the cause the region 202 and the effect region 204. In the indicator object 210, the computer system 100 can display a nature of relationships between the dimensions and the measures represented by the dimension objects and the measure objects, respectively. For example, the computer system 100 can display "100%" in the indicator object 210 to indicate that the nature of relationships between the dimensions and measures is a percentage relationship.

Figure 2B:
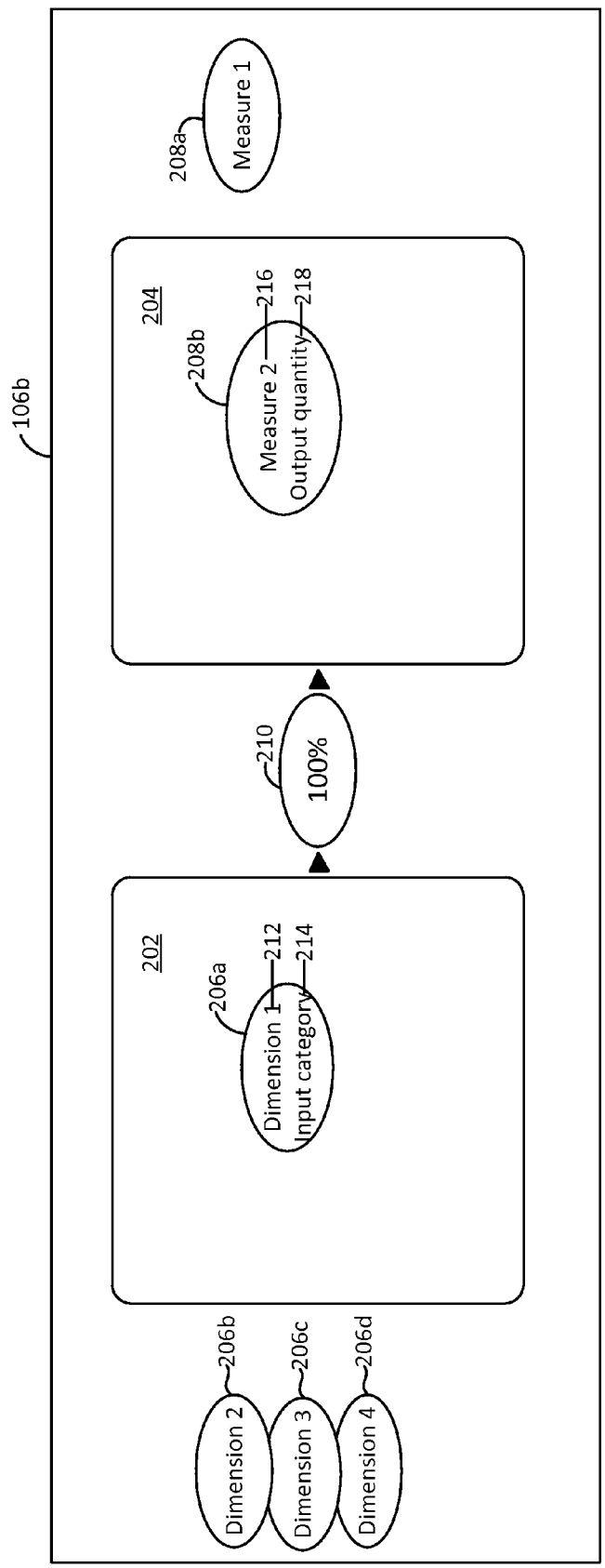
Figure 2E:
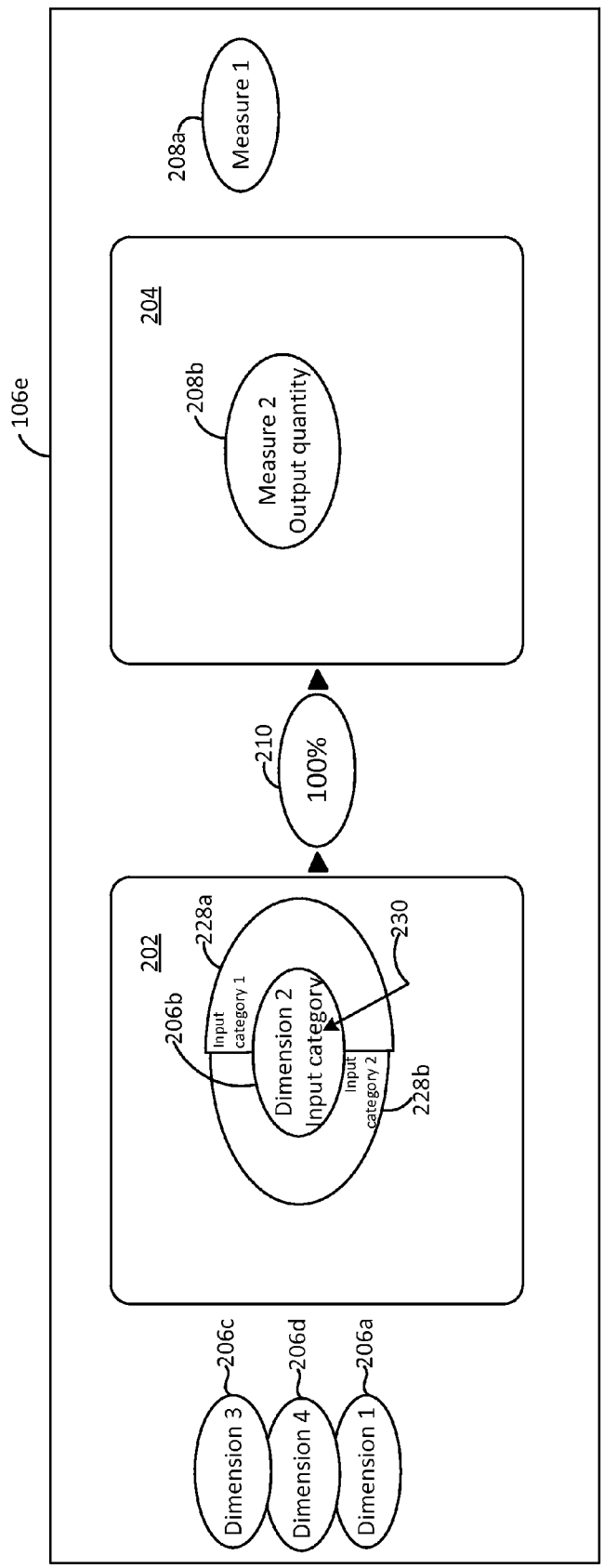

As described below, a user can visualize a relationship between a dimension and a measure by positioning a dimension object that represents the dimension and a measure object that represents the measure in the cause region 202 and in the effect region 204, respectively. As shown in FIG. 2B (user interface 106b), in some implementations, the computer system 100 can detect a first input to move a first dimension object (e.g., dimension object 206a) into the cause region 202. The first dimension object represents a first input category associated with a first input quantity. For example, the dimension object 206a can represent a product sold by a company. The company can have sold two products, namely, cars and trucks. The dimension object 206a can represent cars by default. Techniques to change the default representation from cars to trucks are described below. In the dimension object 206a displayed in the cause region 202, the computer system 100 can display a name of the dimension (i.e., dimension 212, e.g., "product") and a name of the input category (i.e., input category 214, e.g., "car").

In some implementations, the user can provide the first input by positioning a position indicator (e.g., a cursor) controlled by an input device (e.g., a mouse 112) over the dimension object 206a and perform a drag-and-drop operation of the dimension object 206a into the cause region 202.

In some implementations, e.g., implementations using mobile computer system 118, the first input can be a touch input (e.g., using the user's finger) or using a stylus.

The computer system 100 can detect a second input to move a first measure object (e.g., measure object 208b) into the effect region 204. The second input can be similar to the first input, e.g., a drag-and-drop operation or a touch input or other input. The first measure object represents a first output category associated with a first output quantity. For example, the measure object 208b can represent profit (or revenue) obtained by selling the items including the products represented by the dimension object 206a. In the measure object 208b, the computer system 100 can display a name of the measure (i.e., measure 216, e.g., "profit") and a name of the output quantity (i.e., output quantity 218, e.g., "33%"). The computer system 100 can determine the output quantity based on the first input quantity from the total quantity in the data set. For example, the computer system 100 can access the table in which the data set is stored. The computer system 100 can determine a quantity that represents a percentage of the total profit or total revenue (i.e., 100%) generated by selling cars. In the example described with reference to FIG. 2B, this quantity is 33%. In this manner, the computer system 100 can display a result, i.e., "33%," representing the first output quantity in the first measure object. In addition, a size of the measure object 208b can correspond to the quantity, as further described below.

In some implementations described with reference to FIG. 2C (user interface 106c), the computer system 100 can detect a third input to move a second dimension object (e.g., dimension object 206b) into the cause region 202. The second dimension object represents a second input category associated with a second input quantity. For example, the dimension object 206a can represent a color of the product sold by the company. The company can have sold the two products, namely, cars and trucks, in two colors, e.g., black and red. The dimension object 206b can represent black color by default. In the dimension object 206b displayed in the cause region 202, the computer system 100 can display a name of the dimension (i.e., dimension 220, e.g., "color") and a name of the input category (i.e., input category 222, e.g., "black").

In addition, the computer system 100 can determine, from the data set, a second output quantity based on the first input quantity and a second input quantity represented by the third dimension object. For example, as described above, the computer system 100 had determined that cars formed 33% of the profit. The computer system 100 can further determine a percentage of the profit formed by black cars, e.g., 16%. The computer system 100 can replace the result displayed in the measure object 208b in the effect region 204 with a new result (i.e., output quantity 224, e.g., "16%") representing the second output quantity. In this manner, the computer system 100 can determine the second output quantity by determining a percentage of the first input quantity and the second input quantity to the total quantity in the data set. Because the output quantity 224 (i.e., 16%) is less than the previously displayed output quantity 218 (i.e., 33%), the computer system 100 can display the measure object 208b shown in FIG. 2C to be of a smaller size than that of the measure object 208b shown in FIG. 2B. Conversely, had the output quantity 224 been greater than the previously displayed output quantity, the computer system 100 would have displayed the measure object 208b shown in FIG. 2C to be of a larger size than that of the measure object 208b shown in FIG. 2B. Such a variation in display can instantaneously communicate a change in the output quantities to a user viewing the user interface.

In some implementations described with reference to FIG. 2D (user interface 106d), the computer system 100 can detect input to remove the first dimension object (i.e., dimension object 206a) from the cause region 202. For example, the user can perform a drag-and-drop operation to remove the dimension object 206a from within the cause region 202 to outside the cause region 202. In response, the computer system 100 can remove the dimension object 206a from within the cause region 202, leaving the dimension object 206b. The computer system 100 can determine, from the data set, a third output quantity based on the second input quantity from the total quantity in the data set. In this example, the computer system 100 can determine a percentage of black products (i.e., cars and trucks) that accounted for the total profit. Upon determining that the percentage is 52%, the computer system 100 can replace the result displayed in the measure object 208b with the new output quantity 226, i.e., "52%."

As described above, a dimension object can represent more than one input category and can be assigned a default input category. For example, the dimension object 206a can represent two products—cars and trucks—and can be assigned cars as a default. In some implementations described with reference to FIG. 2E (user interface 106e), the computer system 100 can display the multiple input categories represented by a dimension object in response to a selection of the dimension object. For example, the user can select (e.g., by a mouseover or a touch operation) the dimension object 206b. The computer system 100 can detect the selection and, in response, display multiple boundaries (e.g., boundary 228a, boundary 228b) surrounding the dimension object 206b. In general, the computer system 100 can determine, by accessing the data set, a number of input categories represented by the dimension object. The computer system 100 can generate a number of boundaries equal to the number of input categories. To each boundary, the computer system 100 can assign an area such that a sum of the areas assigned to the multiple input categories occupies all or at least a portion of a circumference of the dimension object 206b. In each boundary, the computer system 100 can display an input category. In some implementations, the computer system 100 can assign an equal area to each input category. For example, in the boundary 228a, the computer system 100 can display the input category 1 (e.g., "red"), and in the boundary 228b, the computer system 100 can display the input category 2 (e.g., "black"). In addition, the computer system 100 can display each boundary to be visually discernible from other boundaries. For example, the computer system 100 can display the boundary 228a in a blue color and display the boundary 228b in a variant of blue color.

Figure 2F:
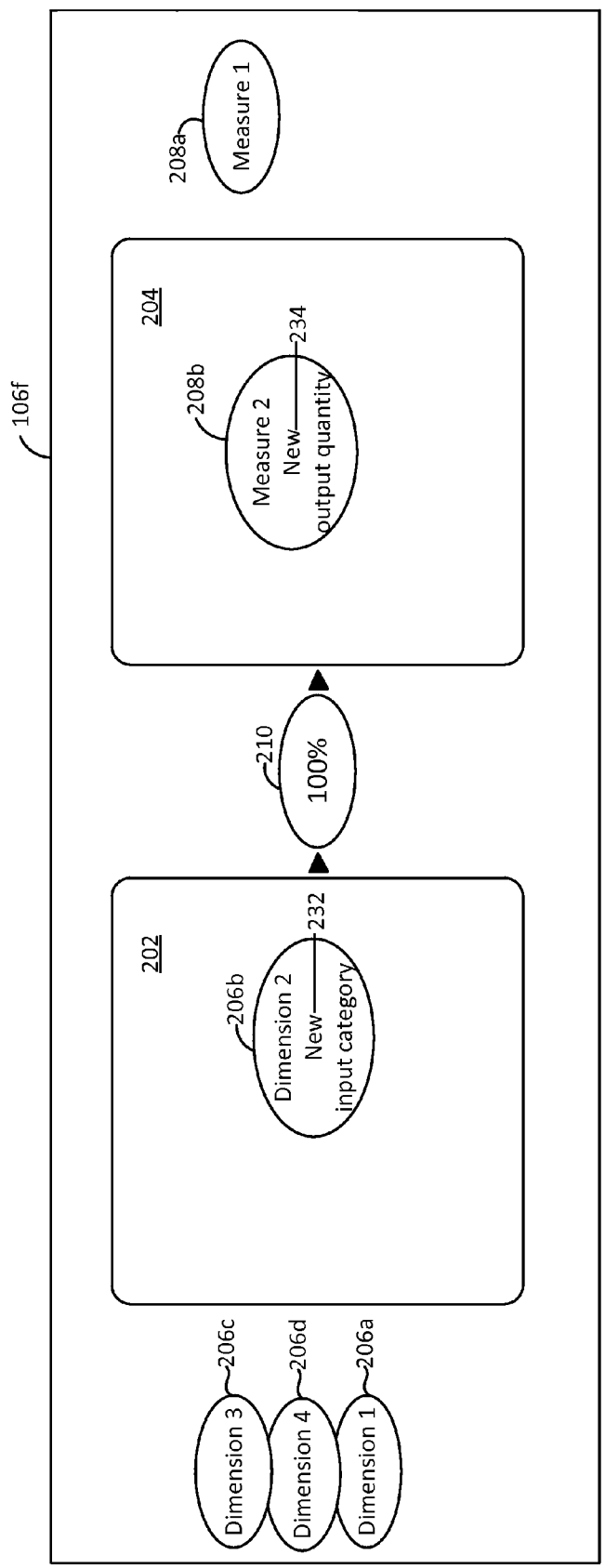
Figure 2H:
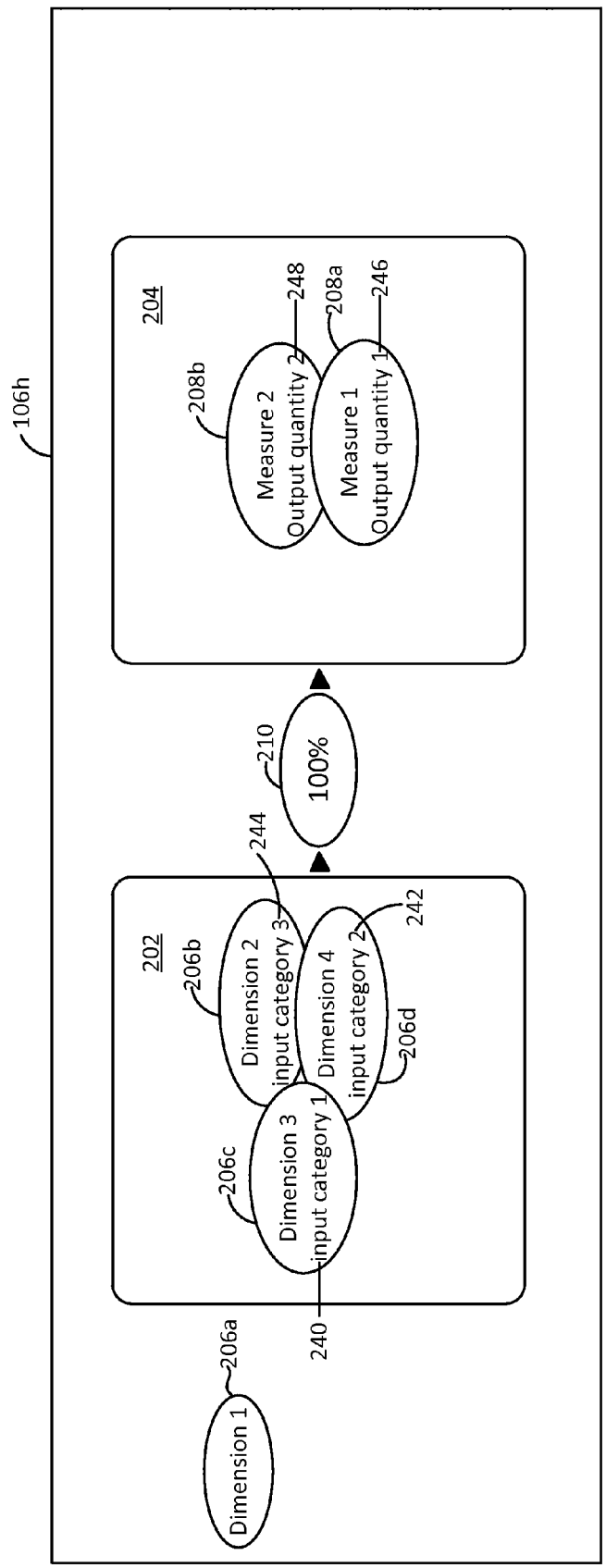

As described above, the dimension object 206b represented the color "black" as the default input category. In the measure object 208b, the computer system 100 displayed a percentage of black products that accounted for a total profit. In some implementations, the user can change the input category from the default to a different category. For example, after performing a mouseover operation on the dimension object 206b, which results in the different input categories being displayed in boundaries, the user can select an input category other than the default (e.g., the color "red"). In response, the computer system 100 can modify the input category represented by the dimension object 208b. As shown in FIG. 2F (user interface 1060, the computer system 100 can display the new input category 232 in the dimension object 206b. In addition, the computer system 100 can determine an output quantity that is based on the input quantity represented by the modified input category. That is, the computer system 100 can determine a percentage of red cars that accounted for a total profit, e.g., 48%. The computer system 100 can replace the result displayed in the measure object 208b with a new output quantity 234 representing the percentage, i.e., "48%."

In the examples described above, the computer system 100 determined the part contribution of one of multiple input categories represented by a dimension object to an output category represented by a measure object. In some implementations, described with reference to FIG. 2G (user interface 106g), the computer system 100 can determine the whole contribution of all input categories represented by a dimension object to the output category represented by the measure object. For example, the computer system 100 can detect a selection of the dimension object 206b displayed in the cause region 202. The user can perform a mouseover operation followed by a selection (e.g., clicking) operation of the dimension object 206b. The computer system 100 can determine the selection to be an input to determine a whole contribution of all input categories represented by the dimension object 206b to the output category represented by the measure object 208b. In response to detecting the selection, the computer system 100 can display a marker object 236 in the dimension object 206b. The marker object 236 indicates the selection of the multiple input categories represented by the dimension object 206b. For example, the marker object 236 indicates the selection of "black" and "red."

From the data set, the computer system 100 can determine an output quantity based on multiple input quantities associated with the multiple input categories from the total quantity in the data set. For example, the computer system 100 can determine a contribution of all colors represented by the dimension object 206b to the profit. Because the dimension object 206b is the only dimension object in the cause region 202, the contribution of all input categories represented by the dimension object 206b to the measure (i.e., profit) represented by the measure object 208b is 100%. Consequently, the computer system 100 can replace the result that was previously displayed in the measure object 208b with the new result 238 representing the output quantity, i.e., "100%" in this example. To remove the marker object 236, the user can select the dimension object 206b. In response, the computer system 100 can remove the marker object 236 and associate one of the multiple input categories to the dimension object 206b.

The percentage displayed in the measure object 208b will change when a new dimension object is added to the cause region 202. For example, a user can drag-and-drop the dimension object 206c into the cause region 202. The dimension object 206c can represent four countries in which the products were sold—U.S.A., France, Germany and Spain. The default country can be France. When the marker object 236 is displayed in the dimension object 206b, the computer system 100 can determine a percentage of products of all colors sold in France (e.g., 25%) and display "25%" in the measure object 208b. When the user selects the dimension object 206c (e.g., a mouseover operation), the computer system 100 can display the four countries represented by the dimension object 206c in boundaries surrounding the dimension object 206c. The user can replace "France" with "Spain" as the input category. In response, the computer system 100 can determine a percentage of products of all colors sold in Spain (e.g., 18%) and display "18%" in the measure object 208b. In some implementations, the user can select the dimension object 206c causing a marker object to be displayed in the dimension object 206c. Because a percentage of products of all colors sold in all countries is 100%, the computer system 100 can replace "18%" in the measure object 208b with "100%."

In the example user interfaces described above, the measure object 208b represented a profit. In some implementations, the computer system 100 can display an alternative or additional measure object 208a that represents a different output category, e.g., a revenue. In such implementations, instead of displaying a percentage of profit, the computer system 100 can display a number (e.g., in currency such as dollars) representing the profit and the revenue. As described with reference to FIG. 2H (user interface 106h), the computer system 100 displays the dimension object 206b, the dimension object 206c, and the dimension object 206d in the cause region 202. The computer system 100 further displays the input category 244, the input category 240, and the input category 242 in the dimension objects 206b, 206c, and 206d, respectively. A user can change the default input category represented by a dimension object as described above. Also, the user can select all the input categories represented by a dimension object as described above resulting in a marker object being displayed in the dimension object.

In the effect region 204, the computer system 100 displays the measure object 208a and the measure object 208b. The computer system 100 further displays the output quantity 246 and the output quantity 248 in the measure object 208a and the measure object 208b, respectively. The output quantity 246 represents a percentage of a number (e.g., in currency) such as a profit or a revenue. The output quantity 246 represents a percentage of the profit or the revenue. In response to the user dragging and dropping the three dimension objects into the cause region 202, the computer system 100 can determine percentages or whole numbers such as those described above. For example, the dimension object 206b, the dimension object 206c, and the dimension object 206d can represent a color (e.g., black), a country (e.g., Spain), and a year (e.g., 2006), respectively. The computer system 100 can determine that a percentage of profit from selling black products in Spain in 2006 is 4% of all products sold in all countries over multiple years. The computer system 100 can determine that a percentage of revenue from selling black products in Spain in 2006 is 2% of all products sold in all countries over multiple years. The computer system 100 can display 4% and 2% in the measure object 208b and the measure object 208a, respectively.

Figure 2I:
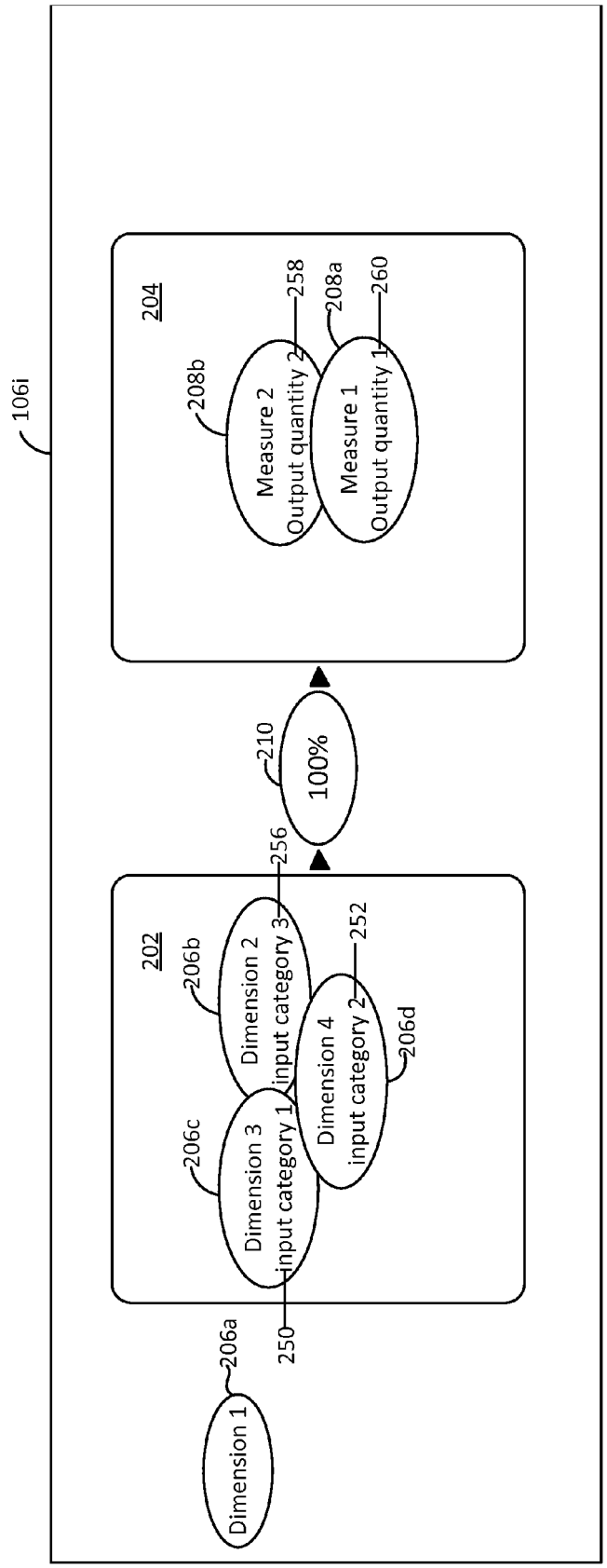

FIG. 2I (user interface 106i) shows that the input categories represented by the dimension object 206b, the dimension object 206c, and the dimension object 206d have been changed from input category 244, input category 240, and the input category 242, respectively, to input category 256, 250, and 252, respectively. For example, the input categories have been changed to represent the color red, the country France, and the year 2007. The computer system 100 can determine that a percentage of profit from selling red products in France in 2007 is 8% of all products sold in all countries over multiple years. The computer system 100 can also determine that a percentage of revenue from selling red products in France in 2007 is 8% of all products sold in all countries over multiple years. The computer system 100 can replace 4% and 2% displayed in the measure object 208b and the measure object 208a, respectively, with 8% (output quantity 258) and 8% (output quantity 260), respectively.

Figure 2J:
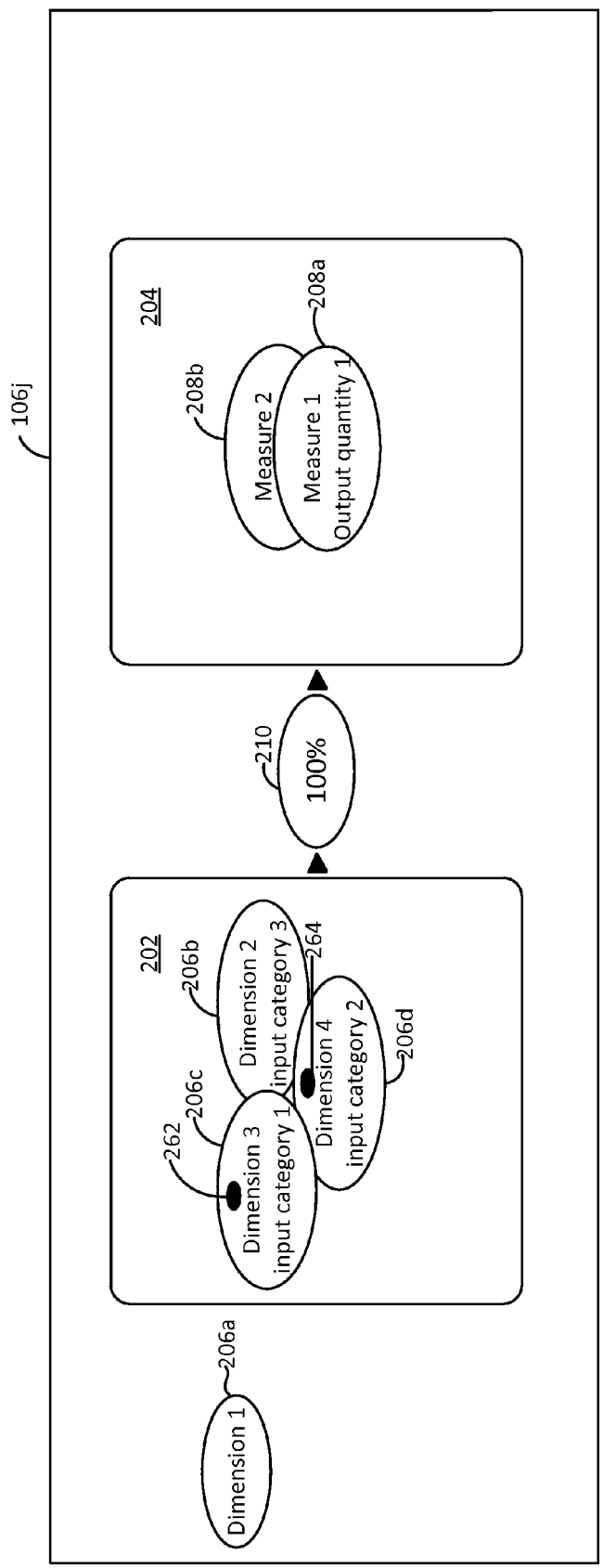
Figure 3A:
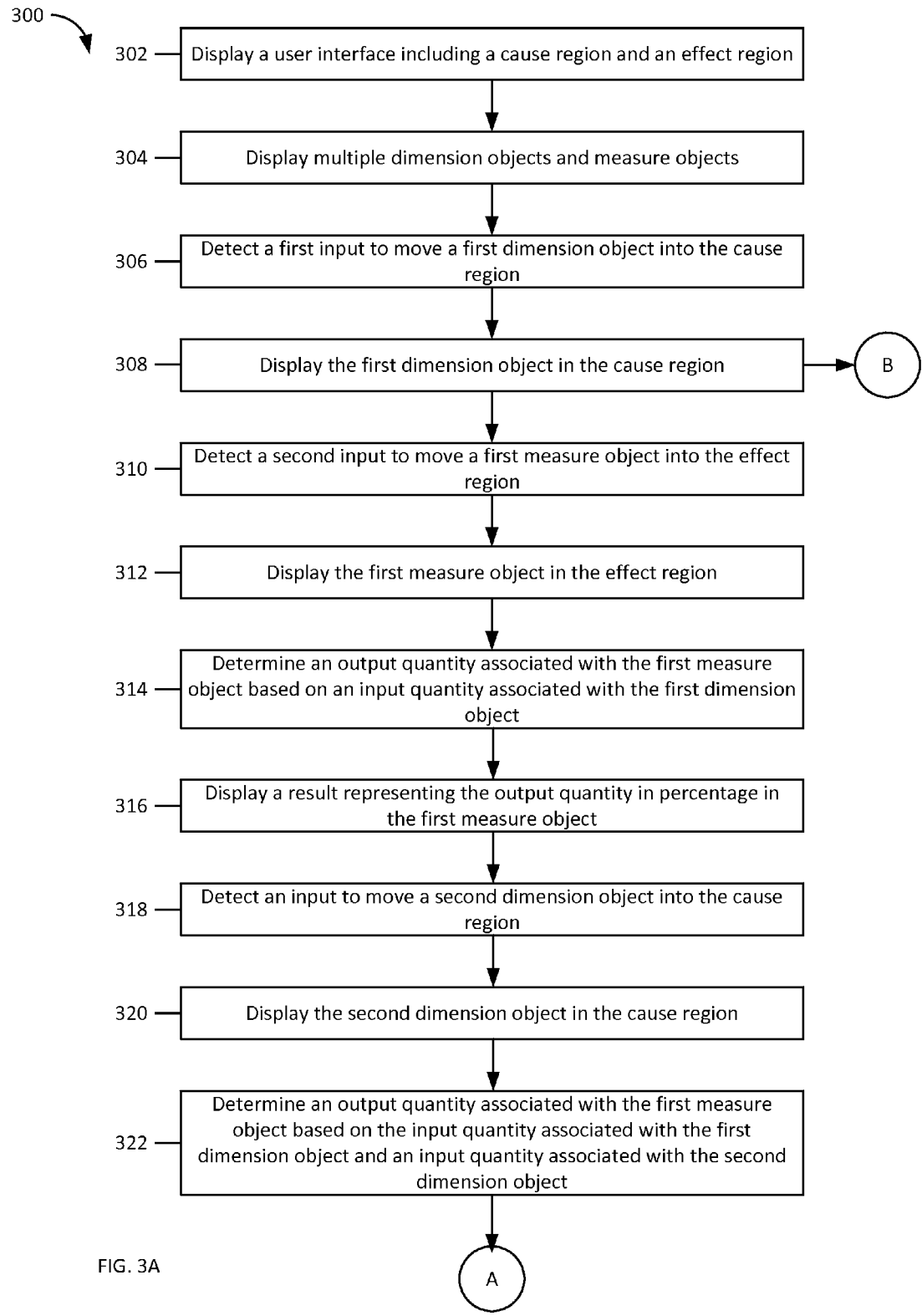
FIGS. 3A-3D are flowcharts showing a process to present visualizations of data in data sets.
Figure 3B:
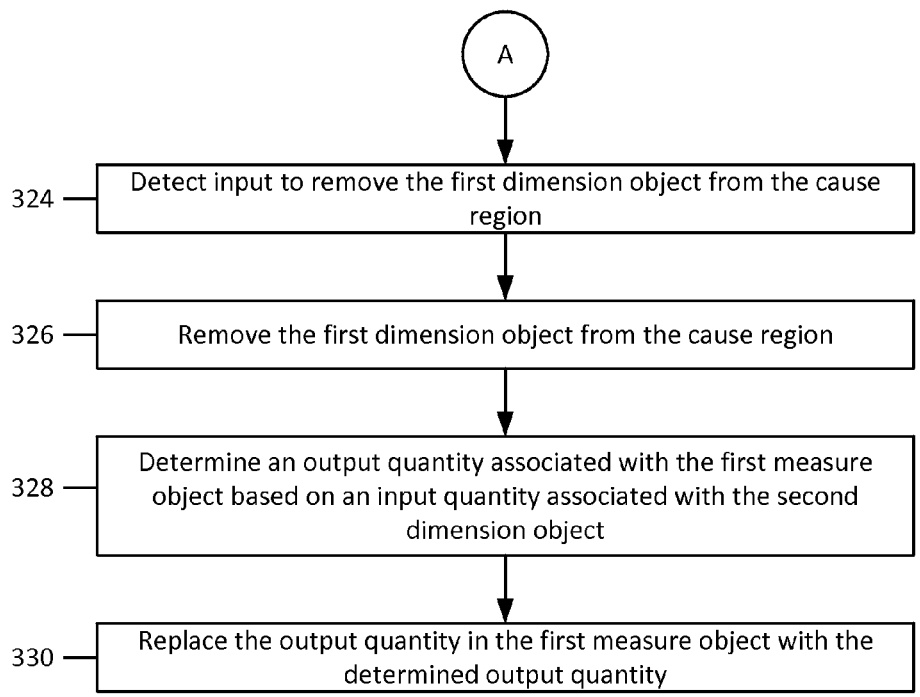
Figure 3C:
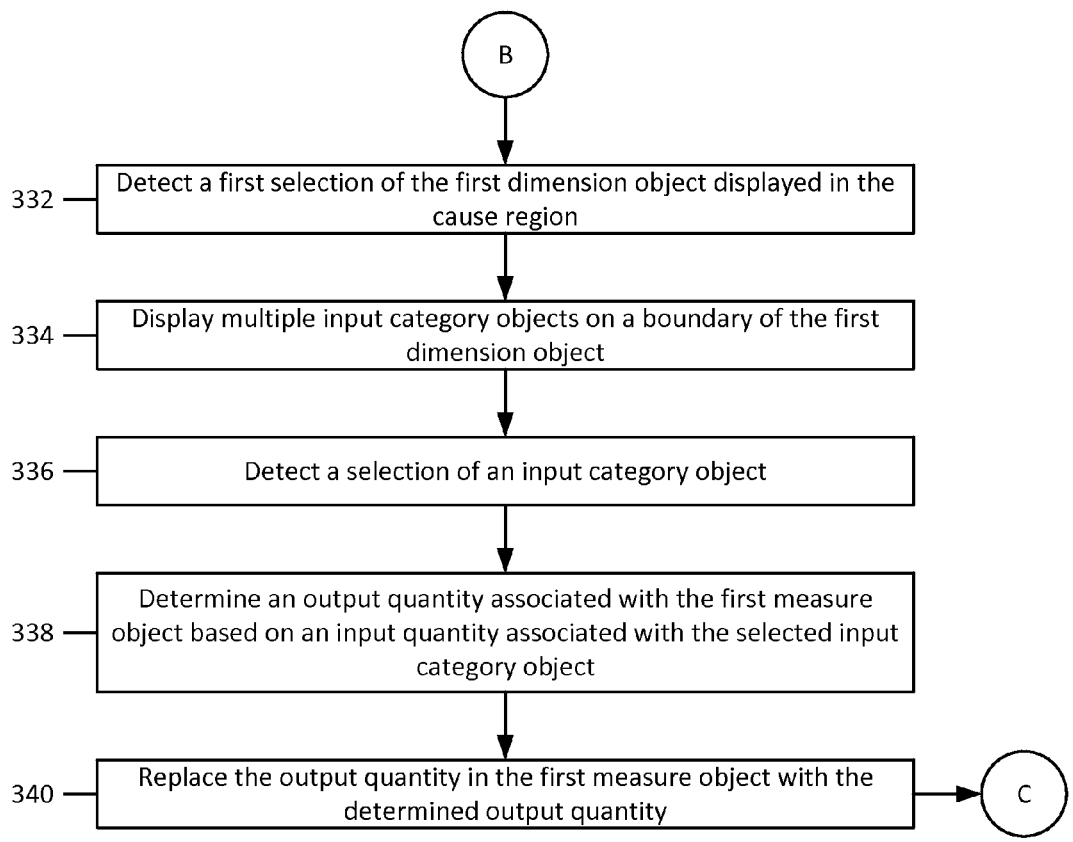
Figure 3D:
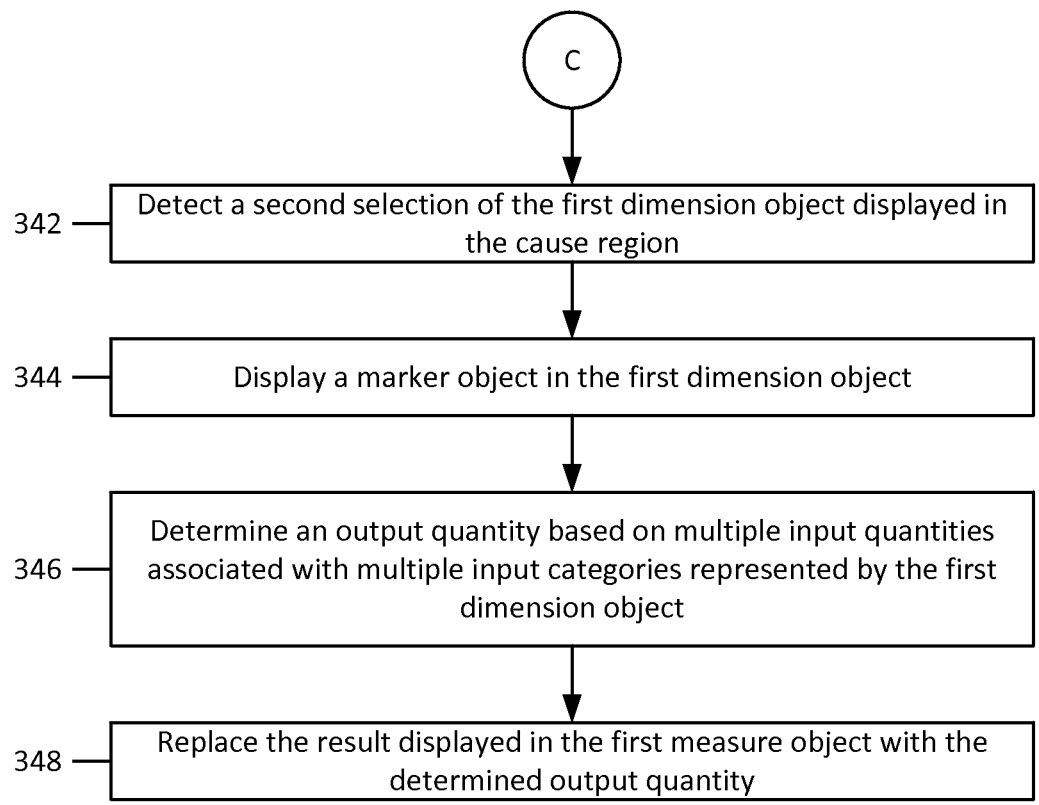

FIG. 2J (user interface 106j) shows that a marker object 262 and a marker object 264 have been displayed in the dimension object 206c and the dimension object 206d, respectively. The presence of the marker object indicates that a whole contribution of multiple input categories represented by the dimension object is being considered rather than a part contribution of one of the multiple input categories represented by the dimension object. The computer system 100 can determine that a percentage of profit from selling products of any color in any country in the year 2006 is 63%. The computer system 100 can further determine that a percentage of revenue from selling products of any color in any country in the year 2007 is 52%. The computer system 100 can replace 8% and 8% displayed in the measure object 208b and the measure object 208a, respectively, with 63% and 52%, respectively. In addition, the computer system 100 can display the measure object 208b and the measure object 208a to be of larger sizes relative to the objects displayed in user interface 106i.

FIGS. 3A-3D are flowcharts showing a process 300 to present visualizations of data in data sets. The process 300 can be implemented as computer instructions stored on computer-readable media (for example, the computer-readable medium 104) and executable by data processing apparatus (for example, data processing apparatus 102). For example, the process 300 can be implemented by the computer system 100. At 302, a user interface including a cause region and an effect region can be displayed. At 304, multiple dimension objects and multiple measure objects can be displayed, e.g., adjacent the cause region and the effect region, respectively. At 306, a first input to move a first dimension object into the cause region can be detected. At 308, the first dimension object can be displayed in the cause region. At 310, a second input to move a first measure object into the effect region can be detected. At 312, the first measure object can be displayed in the effect region.

At 314, an output quantity associated with the first measure object can be determined based on an input quantity associated with the first dimension object. At 316, a result representing the output quantity, in percentage, can be displayed in the first measure object. At 318, an input to move a second dimension object into the cause region can be detected. At 320, the second dimension object can be displayed in the cause region. At 322, an output quantity associated with the first measure object can be determined based on the input quantity associated with the first dimension object and an input quantity associated with the second dimension object. At 324 (FIG. 3B), input to remove the first dimension object from the cause region can be detected. At 326, the first dimension object can be removed from the cause region. At 328, an output quantity associated with the first measure object can be determined based on an input quantity associated with the second dimension object. At 330, the output quantity, in percentage, in the first measure object can be replaced with the output quantity determined at 328.

As described above, at 308, the first dimension object can be displayed in the cause region in response to detecting a first input object to move the first dimension object into the cause region. At 332 (FIG. 3C), a first selection of the first dimension object displayed in the cause region can be detected. At 334, multiple input category objects associated with the first dimension object can be displayed on a boundary of the first dimension object. At 336, a selection of an input category on the boundary can be detected. At 338, an output quantity associated with the first measure object can be determined based on an input quantity associated with the selected input category object. At 340, the output quantity in the first measure object can be replaced with the output quantity determined at 340. At 342 (FIG. 3D), a second selection (e.g., a mouse click selection) of the first dimension object displayed in the cause region can be detected. At 344, a marker object can be displayed in the first dimension object. At 346, an output quantity based on multiple input quantities associated with multiple input categories represented by the first dimension object can be determined. At 348, the result displayed in the first measure object can be replaced with the determined output quantity (e.g., "100%" since there is only one dimension object).

The computer system 100 can implement animations when performing operations associated with one or more dimension objects or measure objects, e.g., when moving a dimension object or measure object from one region to another and/or within the same region or when performing other operations. For example, the computer system 100 can animate the display of multiple dimension objects or multiple answer objects (or both) in the user interface in response to the detection of the data set. In another example, the computer system 100 can animate the movement of a dimension object from one location to another location, e.g., from outside the cause region 202 to inside the cause region 202 or vice versa or within the cause region 202. The computer system 100 can animate the display of multiple input categories on the boundary of a dimension object in response to a selection of the dimension object. For example, starting at a location on a boundary of the dimension object, the computer system 100 can start displaying the boundary in a clockwise (or counter-clockwise) manner until the boundary surrounds the entire dimension object. In general, the computer system 100 can animate any movement of any object or any change to an appearance of any object in response to any input that includes or excludes a selection of the object.

The computer system 100 can perform the operations associated with the one or more dimension objects and/or measure objects in real time. In a real-time operation, the computer system 100 implements the operation as immediately as the computer system's processing power allows in response to receiving an input to perform the operation. For example, in response to detecting an input to move a first dimension object into the cause region 202 and a first measure object into the effect region 204, the computer system 100 can, in real time, determine a percentage that represents a part contribution of an input category represented by the dimension object to a total and display the percentage in the measure object. In another example, in response to determining that an output quantity associated with a measure object has changed, the computer system 100 can, in real time, replace the previous output quantity displayed in the measure object with the changed output quantity and, in real time, modify (e.g., increase or decrease or keep the same) a size of the measure object based on the changed output quantity.

Implementations of the subject matter and the operations described in this disclosure can be implemented in digital electronic circuitry, or in computer software, firmware, or hardware, including the structures disclosed in this disclosure and their structural equivalents, or in combinations of one or more of them. Implementations of the subject matter described in this disclosure can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, for example, a machine-generated electrical, optical, or electromagnetic signal that is generated to encode information for transmission to suitable receiver apparatus for execution by a data processing apparatus. A computer storage medium, for example, the computer-readable medium 104, can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical and/or non-transitory components or media (for example, multiple CDs, disks, or other storage devices).

In some implementations, the operations described in this disclosure can be implemented as a hosted service provided on a server in a cloud computing network. For example, the computer-readable storage media can be logically grouped and accessible within a cloud computing network. Servers within the cloud computing network can include a cloud computing platform for providing cloud-based services. The terms "cloud," "cloud computing," and "cloud-based" may be used interchangeably as appropriate without departing from the scope of this disclosure. Cloud-based services can be hosted services that are provided by servers and delivered across a network to a client platform to enhance, supplement, or replace applications executed locally on a client computer. The system can use cloud-based services to quickly receive software upgrades, applications, and other resources that would otherwise require a lengthy period of time before the resources can be delivered to the system.

The operations described in this disclosure can be implemented as operations performed by a data processing apparatus on data stored on one or more computer-readable storage devices or received from other sources. The term "data processing apparatus" encompasses all kinds of apparatuses, devices, and machines for processing data, including by way of example a programmable processor, a computer, a system on a chip, or multiple ones, or combinations, of the foregoing. The apparatus can include special purpose logic circuitry, for example, an FPGA (field programmable gate array) or an ASIC (application-specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing, and grid computing infrastructures.

A computer program (also known as a program, software, software application, script, or code) can be written in any form of programming language, including compiled or interpreted languages and declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (for example, one or more scripts stored in a markup language document), in a single file dedicated to the program in question, or in multiple coordinated files (for example, files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, for example, an FPGA (field programmable gate array) or an ASIC (application-specific integrated circuit).

Processors suitable for the execution of a computer program include, by way of example, both general and special purpose microprocessors and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, for example, magnetic, magneto optical disks, or optical disks. However, a computer need not have such devices. Moreover, a computer can be embedded in another device, for example, a mobile telephone, a personal digital assistant (PDA), a mobile audio or video player, a game console, a Global Positioning System (GPS) receiver, or a portable storage device (for example, a universal serial bus (USB) flash drive), to name just a few. Devices suitable for storing computer program instructions and data include all forms of non-volatile memory, media, and memory devices, including by way of example semiconductor memory devices, for example, EPROM, EEPROM, and flash memory devices; magnetic disks, for example, internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this disclosure can be implemented on a computer having a display device, for example, a CRT (cathode ray tube) or LCD (liquid crystal display) monitor, for displaying information to the user, and a keyboard, a pointing device, for example, a mouse or a trackball, or a microphone and speaker (or combinations of them) by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this disclosure can be implemented in a computing system that includes a back-end component, for example, as a data server, or that includes a middleware component, for example, an application server, or that includes a front-end component, for example, a client computer having a graphical user interface or a web browser through which a user can interact with an implementation of the subject matter described in this disclosure, or any combination of one or more such back-end, middleware, or front-end components. The components of the system can be interconnected by any form or medium of digital data communication, for example, a communication network. Examples of communication networks include a local area network ("LAN") and a wide area network ("WAN"), an inter-network (for example, the Internet), and peer-to-peer networks (for example, ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (for example, an HTML page) to a client device (for example, for purposes of displaying data to and receiving user input from a user interacting with the client device). Data generated at the client device (for example, a result of the user interaction) can be received from the client device at the server.

While this disclosure contains many specific implementation details, these should not be construed as limitations on the scope of any implementations or of what may be claimed, but rather as descriptions of features specific to particular implementations of particular implementations. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:
1. A method comprising:
    displaying, by one or more computer systems, a user interface comprising a cause region and an effect region, the cause region and the effect region representing non-overlapping defined areas within the user interface;

displaying, by the one or more computer systems, a plurality of dimension objects and a plurality of measure objects adjacent to the cause region and the effect region, respectively, each dimension object representing an input category associated with an input quantity that contributes to a total quantity in a data set, each measure object representing an output category associated with an output quantity based on at least one quantity of at least one input category represented by at least one dimension object;

detecting, by the one or more computer systems, a first input to move a first dimension object into the cause region, the first dimension object representing a first input category associated with a first input quantity, wherein the first input category is associated with a plurality of input subcategories;

detecting, by the one or more computer systems, a second input to move a first measure object into the effect region, the first measure object representing a first output category associated with a first output quantity;

in response to detecting the first input and the second input:
  displaying, by the one or more computer systems, the first dimension object in the cause region, wherein the displayed first dimension object includes a display of a subset of the plurality of input subcategories around an outside border of the first dimension object,
  displaying, by the one or more computer systems, the first measure object in the effect region,
  determining, from the data set and by the one or more computer systems, the first output quantity based on the first input quantity from the total quantity in the data set,
  displaying, by the one or more computer systems, a result representing the first output quantity in the first measure object; and detecting, by the one or more computer systems, a selection of a first input subcategory from the subset of the plurality of input subcategories displayed around the outside border of the first dimension object, the selected first input subcategory associated with a first sub-input quantity representing a portion of the first input quantity; and in response to detecting the selection of the first input subcategory:
  determining, from the data set, a revised output quantity based on the first sub-input quantity from the total quantity in the data set, and
  replacing the result displayed in the first measure object with a new result representing the revised output quantity corresponding to the first sub-input quantity.

2. The method of claim 1, wherein the first output quantity is a percentage of the first input quantity to the total quantity in the data set, and wherein displaying the result representing the first output quantity comprises displaying the percentage in the first measure object.

3. The method of claim 1, further comprising:
detecting a third input to move a second dimension object into the cause region; and
in response to detecting the third input:
  displaying the second dimension object in the cause region,
  determining, from the data set, a second output quantity based on the first input quantity and a second input quantity represented by the second dimension object, and
  replacing the result displayed in the first measure object with a new result representing the second output quantity.

4. The method of claim 3, wherein the second output quantity is a percentage of the first input quantity and the second input quantity to the total quantity in the data set.

5. The method of claim 3, further comprising:
detecting input to remove the first dimension object from the cause region; and
in response to detecting the input to remove the first dimension object from the cause region:
  removing the first dimension object from the cause region,
  determining, from the data set, a third output quantity based on the second input quantity from the total quantity in the data set, and
  replacing the result displayed in the first measure object with a new result representing the third output quantity.

6. The method of claim 1, wherein the method further comprises:
detecting a selection of the first dimension object displayed in the cause region; and
in response to detecting the selection:
  displaying a marker object in the first dimension object, the marker object indicating a selection of the plurality of input subcategories represented by the first dimension object,
  determining, from the data set, a new output quantity based on a plurality of input quantities associated with the plurality of input categories from the total quantity in the data set, and
  replacing the result displayed in the first measure object with a new result representing the new output quantity.

7. The method of claim 1, further comprising:
detecting a fourth input to move a second measure object into the effect region, the second measure object representing a second output category associated with a sixth output quantity;
in response to detecting the fourth input:
  displaying the second measure object in the effect region,
  determining, from the data set, the sixth output quantity based on the first input quantity from the total quantity in the data set, and
  displaying a result representing the sixth output quantity in the second measure object.

8. The method of claim 1, wherein the cause region and the effect region remain in place during and in response to inputs associated with the dimension and measure objects.

9. A non-transitory computer-readable medium storing instructions executable by one or more computer systems to perform operations comprising:
displaying, by one or more computer systems, a user interface comprising a cause region and an effect region, the cause region and the effect region representing non-overlapping defined areas within the user interface;
displaying, by the one or more computer systems, a plurality of dimension objects and a plurality of measure objects adjacent to the cause region and the effect region, respectively, each dimension object representing an input category associated with an input quantity that contributes to a total quantity in a data set, each measure object representing an output category associated with an output quantity based on at least one quantity of at least one input category represented by at least one dimension object;

detecting, by the one or more computer systems, a first input to move a first dimension object into the cause region, the first dimension object representing a first input category associated with a first input quantity, wherein the first input category is associated with a plurality of input subcategories;

detecting, by the one or more computer systems, a second input to move a first measure object into the effect region, the first measure object representing a first output category associated with a first output quantity;

in response to detecting the first input and the second input:
displaying, by the one or more computer systems, the first dimension object in the cause region, wherein the displayed first dimension object includes a display of a subset of the plurality of input subcategories around an outside border of the first dimension object,
displaying, by the one or more computer systems, the first measure object in the effect region,
determining, from the data set and by the one or more computer systems, the first output quantity based on the first input quantity from the total quantity in the data set, and
displaying, by the one or more computer systems, a result representing the first output quantity in the first measure object;

detecting, by the one or more computer systems, a selection of a first input subcategory from the subset of the plurality of input subcategories displayed around the outside border of the first dimension object, the selected first input subcategory associated with a first sub-input quantity representing a portion of the first input quantity; and in response to detecting the selection of the first input subcategory:
determining, from the data set, a revised output quantity based on the first sub-input quantity from the total quantity in the data set, and
replacing the result displayed in the first measure object with a new result representing the revised output quantity corresponding to the first sub-input quantity.

10. The medium of claim 9, wherein the first output quantity is a percentage of the first input quantity to the total quantity in the data set, and wherein displaying the result representing the first output quantity comprises displaying the percentage in the first measure object.

11. The medium of claim 9, wherein the operations further comprise:
detecting a third input to move a second dimension object into the cause region; and
in response to detecting the third input:
displaying the second dimension object in the cause region,
determining, from the data set, a second output quantity based on the first input quantity and a second input quantity represented by the second dimension object, and
replacing the result displayed in the first measure object with a new result representing the second output quantity.

12. The medium of claim 11, wherein the second output quantity is a percentage of the first input quantity and the second input quantity to the total quantity in the data set.

13. The medium of claim 11, wherein the operations further comprise:
detecting input to remove the first dimension object from the cause region; and
in response to detecting the input to remove the first dimension object from the cause region:
removing the first dimension object from the cause region,
determining, from the data set, a third output quantity based on the second input quantity from the total quantity in the data set, and
replacing the result displayed in the first measure object with a new result representing the third output quantity.

14. The medium of claim 9, wherein the operations further comprise:
detecting a selection of the first dimension object displayed in the cause region; and
in response to detecting the selection:
displaying a marker object in the first dimension object, the marker object indicating a selection of the plurality of input subcategories represented by the first dimension object,
determining, from the data set, a new output quantity based on a plurality of input quantities associated with the plurality of input categories from the total quantity in the data set, and
replacing the result displayed in the first measure object with a new result representing the new output quantity.

15. The medium of claim 9, wherein the operations further comprise:
detecting a fourth input to move a second measure object into the effect region, the second measure object representing a second output category associated with a sixth output quantity;
in response to detecting the fourth input:
displaying the second measure object in the effect region,
determining, from the data set, the sixth output quantity based on the first input quantity from the total quantity in the data set, and
displaying a result representing the sixth output quantity in the second measure object.

16. The medium of claim 9, wherein the cause region and the effect region remain in place during and in response to inputs associated with the dimension and measure objects.

17. A system comprising:
one or more computer systems; and
a non-transitory computer-readable medium storing instructions executable by the one or more computer systems to perform operations comprising:
displaying, by one or more computer systems, a user interface comprising a cause region and an effect region, the cause region and the effect region representing non-overlapping defined areas within the user interface:
displaying, by the one or more computer systems, a plurality of dimension objects and a plurality of measure objects adjacent to the cause region and the effect region, each dimension object representing an input category associated with an input quantity that contributes to a total quantity in a data set, respectively, each measure object representing an output category associated with an output quantity based on at least one quantity of at least one input category represented by at least one dimension object;

detecting, by the one or more computer systems, a first input to move a first dimension object into the cause region, the first dimension object representing a first input category associated with a first input quantity, wherein the first input category is associated with a plurality of input subcategories;

detecting, by the one or more computer systems, a second input to move a first measure object into the effect region, the first measure object representing a first output category associated with a first output quantity;

in response to detecting the first input and the second input:

displaying, by the one or more computer systems, the first dimension object in the cause region, wherein the displayed first dimension object includes a display of a subset of the plurality of input subcategories around an outside border of the first dimension object, displaying, by the one or more computer systems, the first measure object in the effect region, determining, from the data set and by the one or more computer systems, the first output quantity based on the first input quantity from the total quantity in the data set, and displaying, by the one or more computer systems, a result representing the first output quantity in the first measure object;

detecting, by the one or more computer systems, a selection of a first input subcategory from the subset of the plurality of input subcategories displayed around the outside border of the first dimension object, the selected first input subcategory associated with a first sub-input quantity representing a portion of the first input quantity; and in response to detecting the selection of the first input subcategory:

determining, from the data set, a revised output quantity based on the first sub-input quantity from the total quantity in the data set, and replacing the result displayed in the first measure object with a new result representing the revised output quantity corresponding to the first sub-input quantity.

18. The system of claim 17, wherein the first output quantity is a percentage of the first input quantity to the total quantity in the data set, and wherein displaying the result representing the first output quantity comprises displaying the percentage in the first measure object.

* * * * *